(12) United States Patent
Loh et al.

(10) Patent No.: US 7,496,069 B2
(45) Date of Patent: Feb. 24, 2009

(54) METHOD AND APPARATUS FOR PUBLIC LONG CODE MASK HANDOFF MANAGEMENT

(75) Inventors: Kim Sun Loh, Round Lake BE, IL (US); Harn-Jier Lin, Lisle, IL (US)

(73) Assignee: Motorola, Inc., Schaumburg, IL (US)

( * ) Notice: Subject to any disclaimer, the term of this patent is extended or adjusted under 35 U.S.C. 154(b) by 907 days.

(21) Appl. No.: 10/431,736

(22) Filed: May 8, 2003

(65) Prior Publication Data
US 2004/0202127 A1 Oct. 14, 2004

Related U.S. Application Data

(60) Provisional application No. 60/462,228, filed on Apr. 11, 2003.

(51) Int. Cl.
*H04Q 7/00* (2006.01)

(52) U.S. Cl. .................. 370/331; 370/335; 370/337; 455/438; 455/439

(58) Field of Classification Search .......... 370/331, 370/335, 337, 456; 455/438, 439
See application file for complete search history.

(56) References Cited

U.S. PATENT DOCUMENTS

| | | | |
|---|---|---|---|
| 6,330,333 B1 * | 12/2001 | Mizikovsky et al. | 380/207 |
| 6,438,117 B1 * | 8/2002 | Grilli et al. | 370/331 |
| 6,611,510 B2 * | 8/2003 | Famolari et al. | 370/335 |
| 7,039,425 B1 * | 5/2006 | Mazawa et al. | 455/456.4 |
| 2002/0142772 A1 * | 10/2002 | Hunzinger | 455/436 |
| 2003/0002525 A1 * | 1/2003 | Grilli et al. | 370/465 |
| 2004/0213280 A1 * | 10/2004 | Patel | 370/441 |

FOREIGN PATENT DOCUMENTS

| WO | WO2001-050638 A1 | 7/2001 |
|---|---|---|
| WO | WO2001-052567 A2 | 7/2001 |

OTHER PUBLICATIONS

TIA/EIA IS-2000.5-C Upper Layer (Layer 3) Signaling Standard for cdma2000 Spread Spectrum Systems Release C, May 2002, Sections 2.6.6.1.1, 2.6.2.5.1, 3.6.1.1, and 3.7.3.3.2.36.
TIA/EIA IS-2001.4-C (PN-4545-RV3) Interoperability Specification (IOS) for cdma2000 Access Network Interfaces—Part 4 (A1, A2, and A5 Interfaces), Oct. 2002, Figure 3.19.3.1.1-1, sections 3.4.3 and 3.4.4.
Wang, Jun et al.: "Decoupling PLCM from ESN", Qualcomm Incorporated, 2001, pp. 1-12.
Yagi et al., "Hard Handoff for New PLCM_32-Rev. 2," 3rd Generation Partnership Project 2 (3GPP2), 3GPP2 TSG-A, Sep. 9, 2002, 20 pages.

* cited by examiner

*Primary Examiner*—Danh C Le

(57) ABSTRACT

To address the need for improved public long code mask (PLCM) management during handoffs, embodiments of the present invention enable a mobile station (MS) (101) to use a different PLCM when communicating with the target base station (BS) (130) than is used when communicating with the serving BS (120). The embodiments provide for signaling between the serving and target BSs, via the mobile switching center (MSC) (115), by which the target BS can provide a new PLCM for communication between the MS and the target BS. By allowing each target BS to allocate and communicate PLCMs for hand-off MSs, today's PLCM sharing, and thus the cross-talk problem, can be avoided.

19 Claims, 4 Drawing Sheets

METHOD AND APPARATUS FOR PUBLIC LONG CODE MASK HANDOFF MANAGEMENT

REFERENCE(S) TO RELATED APPLICATION(S)

The present application claims priority from provisional application Ser. No. 60/462,228, entitled "METHOD AND APPARATUS FOR PUBLIC LONG CODE MASK HANDOFF MANAGEMENT," filed Apr. 11, 2003, which is commonly owned and incorporated herein by reference in its entirety.

FIELD OF THE INVENTION

The present invention relates generally to wireless communications and, in particular, to public long code mask handoff management.

BACKGROUND OF THE INVENTION

CDMA communication systems today are vulnerable to interference and cross-talk between mobile stations (MSs) which are assigned the same public long code mask (PLCM). Because PLCMs are intended to provide a unique addressing mechanism for mobiles, this PLCM sharing is unintended but nonetheless present in today's systems. PLCM sharing can occur as a result of hard handoffs. For example, two MSs served by different base stations (BSs) may be assigned the same PLCM by the independent operation of each BS. Interference can occur, then, when one MS hands off to the same cell/sector occupied by the other MS. Since both MSs are using the same PLCM in proximity to each other, the users may hear each others' conversations without realizing that their individual conversations are no longer private.

Although this cross-talk problem has existed in CDMA systems for many months and has received the attention of 3GPP2 standards body participants, the problem persists even in the most recent PLCM-related changes, the so-called "PLCM_32" functionality. The PLCM_32 functionality was introduced into IS-2000 Revision C and 3G-IOSv4.3 (as both exist on Apr. 11, 2003) to decouple the long code mask from the subscriber electronic serial number (ESN). It allows the BS to specify the long code mask during call setup; however, there is no guideline in the generation of the 32-bit PLCM_32 number by a BS. Therefore, the possibility of sharing PLCM_32 numbers generated by different BSs, especially those of different vendors, still exists. Such sharing must be resolved for hard handoff to avoid the cross-talk problem. Thus, a need exists for improved PLCM management during hard handoffs.

DETAILED DESCRIPTION OF EMBODIMENTS

To address the need for improved public long code mask (PLCM) management during handoffs, embodiments of the present invention enable a mobile station (MS) to use a different PLCM when communicating with the target base station (BS) than is used when communicating with the serving BS. The embodiments provide for signaling between the serving and target BSs, via the mobile switching center (MSC), by which the target BS can provide a new PLCM for communication between the MS and the target BS. By allowing each target BS to allocate and communicate PLCMs for hand-off MSs, today's PLCM sharing, and thus the cross-talk problem, can be avoided.

The present invention encompasses a method for public long code mask (PLCM) handoff management in which a base station (BS) receives a handoff request message for a mobile station (MS) that indicates a hard handoff. In response to the handoff request message, the BS then allocates a new PLCM for use by the MS and sends a handoff request acknowledgment that includes a PLCM identifier that identifies the new PLCM.

Another embodiment of the present invention encompasses a method for PLCM handoff management in which an MS, communicating with a serving base station (BS) using a PLCM, receives a handoff message that includes a PLCM identifier that identifies a new and different PLCM. Subsequently, the MS communicates with a target BS using the new PLCM.

Another embodiment of the present invention encompasses a base station (BS) comprising a base site controller (BSC) and a communicatively coupled base transceiver system (BTS). The BSC is adapted to receive a handoff request message for an MS that indicates a hard handoff, adapted to allocate, in response to the handoff request message, a new PLCM for use by the MS, and adapted to send, in response to the handoff request message, a handoff request acknowledgment that includes a PLCM identifier that identifies the new PLCM. The BTS is adapted to communicate with the MS using the new PLCM.

The present invention also encompasses a mobile station (MS) comprising a transmitter, a receiver, and a processor, which is communicatively coupled to the transmitter and receiver. The processor is adapted to communicate, via the transmitter and receiver, with a serving BS using a public long code mask (PLCM), adapted to receive, via the receiver, a handoff message that includes a PLCM identifier that identifies a new and different PLCM, and adapted to communicate, via the transmitter and receiver, with a target BS using the new PLCM.

Figure 1:
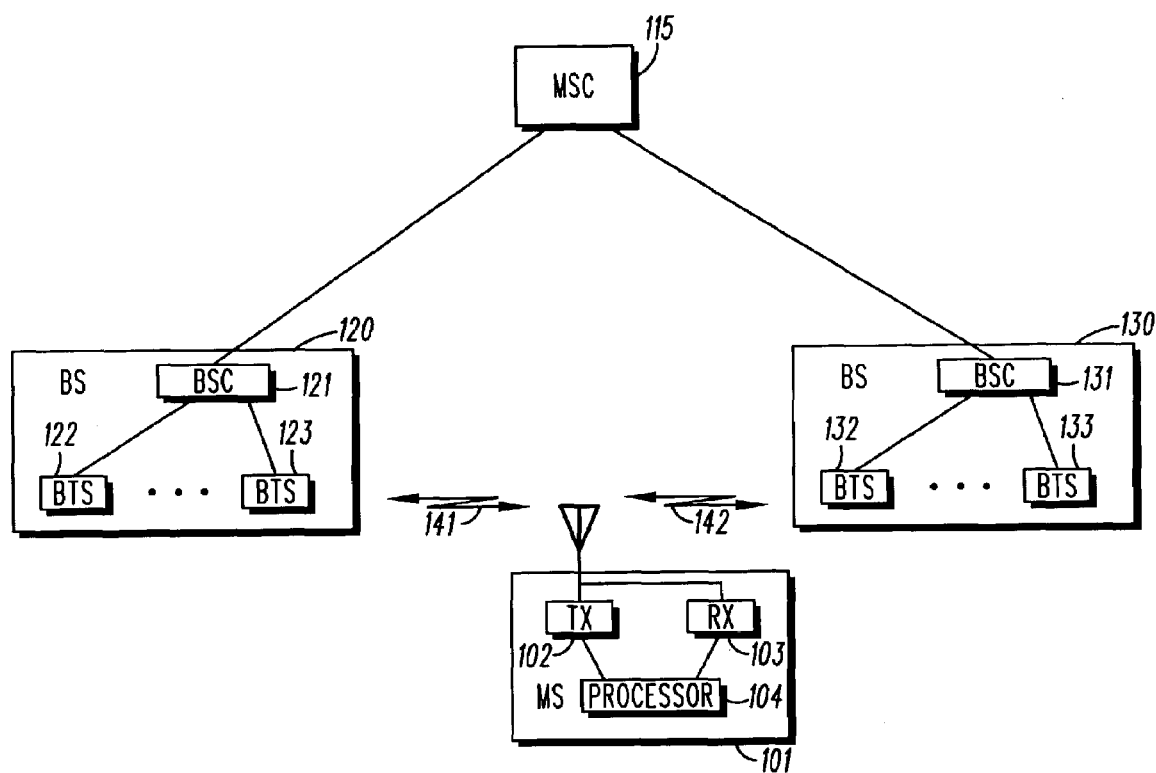
FIG. 1 is a block diagram depiction of a communication system in accordance with a first embodiment of the present invention.

The present invention can be more fully understood with reference to FIGS. 1-4. FIG. 1 is a block diagram depiction of communication system 100 in accordance with a first embodiment of the present invention. Communication system 100 is a system in accordance with the well-known Telecommunications Industry Association/Electronic Industries Association Interim Standard 2000-C (TIA/EIA IS-2000-C or IS-2000-C) and 3G Inter-Operability Specification version 4.3 (3G-IOSv4.3), as of Apr. 11, 2003 (i.e., including PLCM_32 functionality) modified as described below to implement the present invention.

System 100 comprises fixed network equipment and mobile communication units. The fixed network equipment, or communication infrastructure, comprises base stations (BSs) 120 and 130 and mobile switching center (MSC) 115. As is well-known in the art, each BS comprises (at least logically, if not physically) a BSC (e.g., 121 and 131) and one or more base transceiver systems (BTSs) (e.g., 122, 123, 132, and 133). Those skilled in the art are aware of the many ways each of these entities can be implemented and/or purchased from wireless communications companies such as "MOTOROLA." BSs, BSCs, and BTSs, for example, typically comprise components such as processors, memory, and/or logic circuitry designed to implement algorithms that have been expressed as computer instructions and/or in circuitry. Given an algorithm or a logic flow (such as logic flow 300), those skilled in the art are aware of the many design and development techniques available to implement a BS/BSC/BTS that performs the logic, including implementations that span multiple entities and/or multiple physical components.

MS 101 comprises a CDMA-capable wireless phone that communicates with BS 120 and 130 via IS-2000-C wireless interfaces 141 and 142, respectively. MS 101 comprises well-known entities such as processor 104, transmitter 102, and receiver 103. Transmitters, receivers, and processors as used in MSs are well known in the art. This common set of MS components is adapted using known telecommunications design and development techniques to implement the wireless unit aspect of the present invention. Processors typically comprise components such as microprocessors, digital signal processors, memory, and/or logic circuitry designed to implement algorithms that have been expressed as computer instructions and/or in circuitry. Given an algorithm or a logic flow (such as logic flow 400), those skilled in the art are aware of the many design and development techniques available to implement a processor that performs the given logic.

For simplicity, only two BSs, an MSC, and one MS are shown in FIG. 1. However, those skilled in the art will recognize that FIG. 1 does not depict all of the network equipment necessary for system 100 to operate but only those system blocks/logical entities particularly relevant to the description of embodiments herein. That said, operation of communication system 100, in accordance with the various embodiments of the present invention, occurs substantially as follows.

Serving BS 120 is supporting a call involving MS 101. Via a forward and reverse link of wireless interface 141 and via receiver 103 and transmitter 102, processor 104 communicates with BS 120 using a public long code mask (PLCM). Specifically, MS 101 and BS 120 transmit and receive call content to and from each other that is encoded using the PLCM. Examples of different types of call content include voice, audio, video, text messaging, and data. As MS 101 moves and/or its RF signaling environment changes, BS 120 determines that a hard handoff is desirable for MS 101.

In the first embodiment, BSC 121 sends (now additionally referencing FIG. 2) handoff required message 201 (as based on the Handoff Required message of IOSv4.3) to MSC 115 for MS 101. Handoff required message 201 includes a PLCM identifier that identifies the PLCM presently being used by MS 101 and BS 120. BSC 131 receives from MSC 115 handoff request message 203 (as based on the Handoff Request message of IOSv4.3) for MS 101. Handoff request message 203 also includes a PLCM identifier that identifies the PLCM presently being used by MS 101 and BS 120. Because handoff request message 203 includes the PLCM and is received from MSC 115, BSC 131 recognizes that a hard handoff is being requested.

Having received handoff request message 203 with the PLCM from MSC 115 and thereby recognizing that a hard handoff is being requested, BSC 131 allocates a new PLCM for use by the MS. In the case where each BS (BSs 120 and 130, e.g.) has a different (i.e., non-overlapping) subset of PLCMs from which to allocate, the new PLCM will be selected from unallocated PLCMs and thus unique to the MS. Therefore, alternative embodiments are possible in which the handoff required message and/or the handoff request message do not include the PLCM used by the MS and serving BS. In these embodiments, the allocation of a new PLCM is sufficient for uniqueness. Where different subsets of PLCMs cannot be guaranteed from one BS to the next, such as between vendors, the target BS will have the PLCM used by the MS and serving BS and can ensure that the allocated PLCM is different.

In response to the handoff request message and after allocating the new PLCM, BSC 130 sends handoff request acknowledgment 205, which includes a PLCM identifier that identifies the new PLCM, to MSC 115. In the first embodiment, handoff request acknowledgment 205 comprises an IOSv4.3 Handoff Request Ack message with additional fields to convey the new PLCM.

In response to handoff required message 201, BSC 121 receives handoff command message 207, which includes a PLCM identifier that identifies the new PLCM for MS 101. In the first embodiment, handoff command message 207 comprises an IOSv4.3 Handoff Command message with additional fields to convey the new PLCM. In response to handoff command message 207, BSC 121 sends handoff message 209 via a serving BTS (e.g., BTS 123) to MS 101. In the first embodiment, handoff message 209 comprises a handoff direction message, specifically an IS-2000-C Universal Handoff Direction Message (UHDM) with additional fields to convey the new PLCM. For example, a "PLCM_INCL" and "PLCM_32" fields are added and used as follows:

| | |
|---|---|
| PLCM_INCL | The Public Long Code Mask included indicator. The base station shall set this field to '1' if the base station includes PLCM_32 in the message and the USE_ESN_BASED_PLCM is set to 0. The base station shall set this field to '0' if the base station omits PLOM_32 in the message and the USE_ESN_BASED_PLCM is set to 0; otherwise, the base station shall omit this field. |
| PLCM_32 | The 32 LSBs bits of the Public Long Code Mask. If PLCM_INCL is included and set to '1', the base station shall include this field and set it to the 32 least significant bits of the public long code mask used by the mobile station; otherwise, the base station shall omit this field. |

Figure 2:
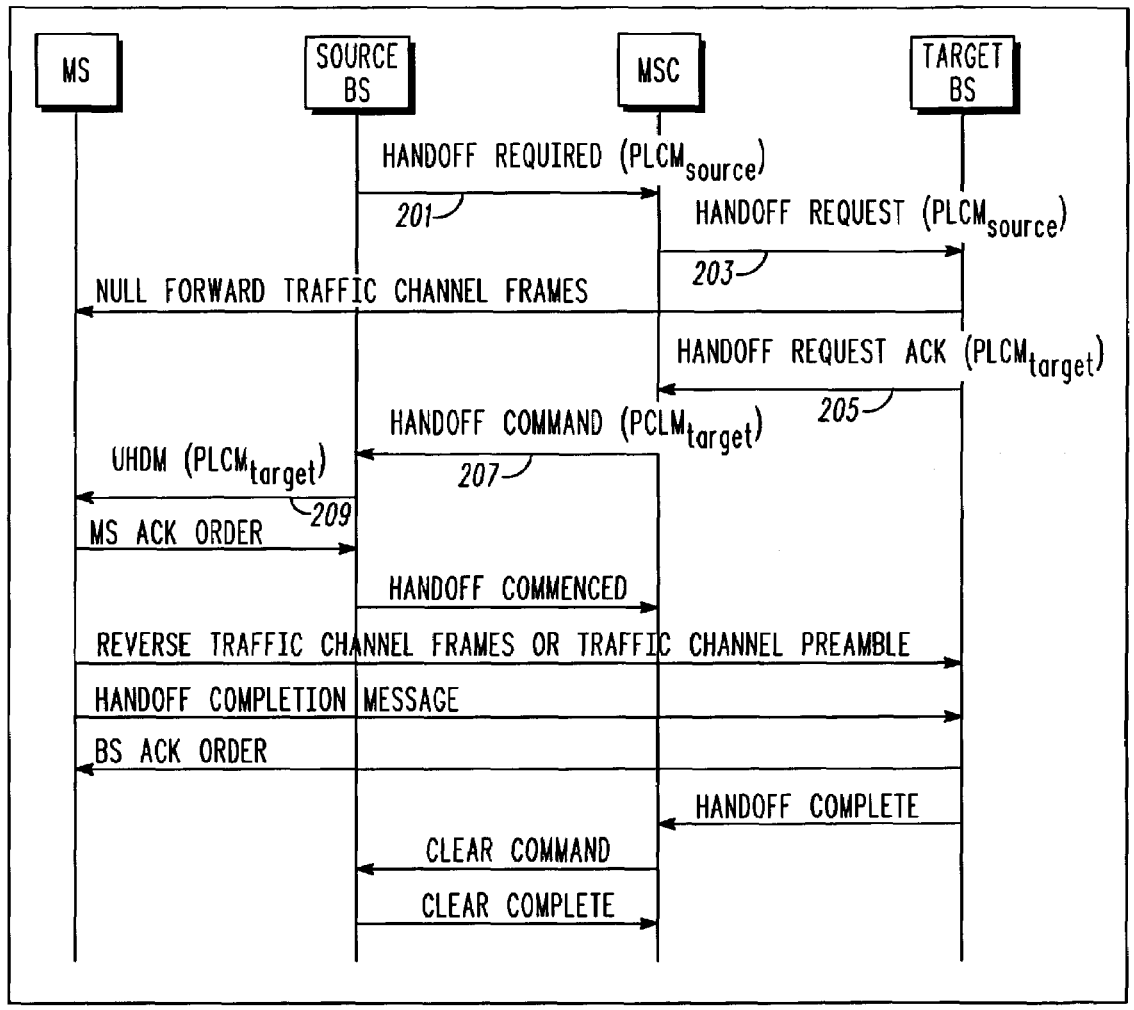
FIG. 2 is a signaling flow diagram in accordance with the first embodiment of the present invention.

Having received handoff message 209 via receiver 103, MS 101 continues with its handoff messaging as shown in FIG. 2 to complete its hard handoff to BS 130. Via a forward and reverse link of wireless interface 142 and via receiver 103 and transmitter 102, processor 104 communicates with BS 130 (e.g., with new serving BTS 132) using the new PLCM allocated by BS 130. Specifically, MS 101 and BS 130 transmit and receive call content to and from each other that is encoded using the new PLCM.

Figure 3:
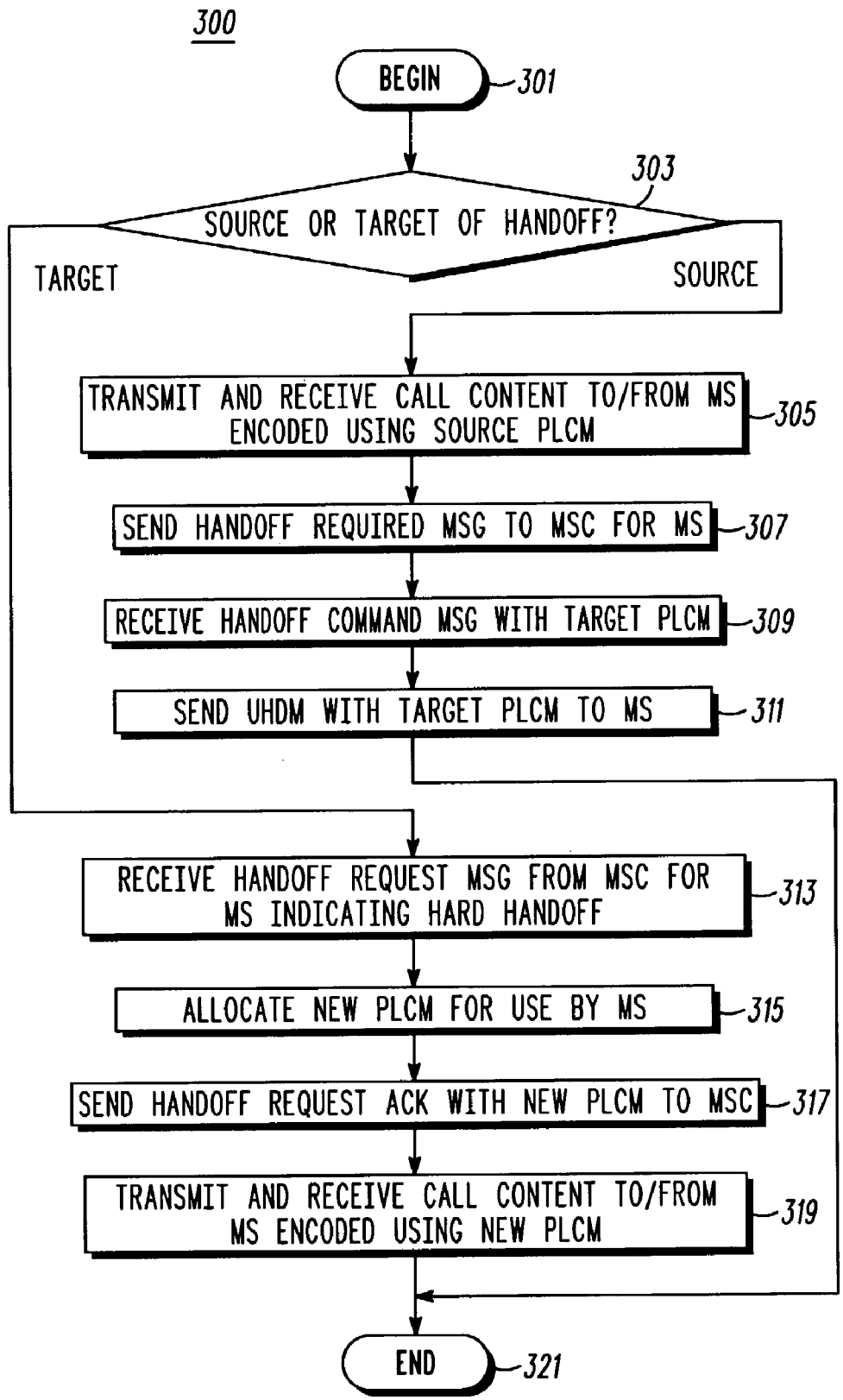
FIG. 3 is a logic flow diagram illustrating the operation of a base station in accordance with the first embodiment of the present invention.

FIG. 3 is a logic flow diagram illustrating the operation of a base station in accordance with the first embodiment of the present invention. Logic flow 300 begins (301) with the BS following one of two logical paths depending on its relationship with respect to the particular MS that is handing off. If (303) the BS is the source (or serving) BS for the handoff, then it is already supporting the MS's present call in logic flow 300. Specifically, the BS is transmitting and receiving (305), to and from the MS, call content, which the BS encodes and decodes using a source PLCM. When handoff conditions are present for the MS, the BS sends (307) a handoff required message to its MSC for the MS. This message includes the source PLMC.

In response to the handoff required message, the BS receives (309) a handoff command message from the MSC. This handoff command includes a target PLCM from the MS's handoff target BS. The BS then sends (311) the target PLCM to the MS, so the MS and target BS can use the target PLCM for communications. The target PLCM is sent to the MS in a modified Universal Handoff Direction Message, and the logic flow for the source BS ends (321).

If instead (303) the BS is the target BS for the handoff, then it will receive (313) a handoff request message from its MSC for the MS. Recognizing that a hard handoff is being requested for the MS, the BS allocates (315) a PLCM for communications between the BS and MS. The BS sends (317) the newly allocated PLCM in a modified Handoff Request Ack message to the MSC (for delivery to the MS via the serving BS). As the hard handoff from the source BS proceeds, the MS and BS begin communicating using the newly allocated PLCM. Specifically, the BS begins transmitting and receiving (319), to and from the MS, call content, which the BS encodes and decodes using the newly allocated PLCM. Logic flow 300 for a target BS thus ends (321).

Figure 4:
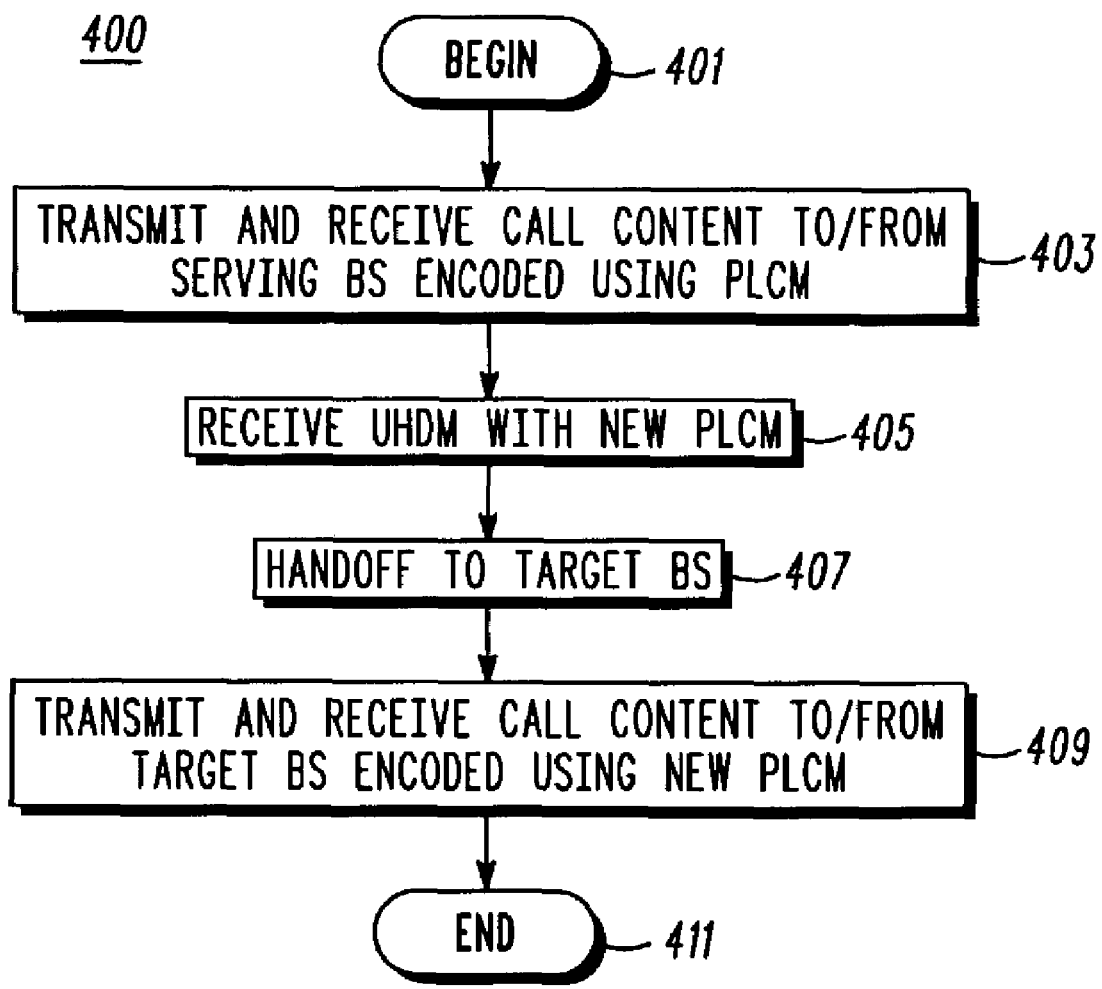
FIG. 4 is a logic flow diagram illustrating the operation of a mobile station in accordance with the first embodiment of the present invention.

FIG. 4 is a logic flow diagram illustrating the operation of a mobile station in accordance with the first embodiment of the present invention. Logic flow 400 begins (401) with the MS involved in a call supported by a serving BS. Specifically, the MS is transmitting and receiving (403), to and from the serving BS, call content, which the MS encodes and decodes using a particular PLCM. At some point during the call a hard handoff to another BS becomes desirable, and the MS receives (405) a modified Universal Handoff Direction Message from the serving BS directing the MS to handoff (407) to a target BS and to use a new PLCM for encoding and decoding communications with the target BS. Thus, the MS begins transmitting and receiving (409), to and from the target BS, call content using the new PLCM, and logic flow 400 ends (411).

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

The invention claimed is:

1. A method for public long code mask (PLCM) handoff management comprising:
   receiving, by a base station (BS), a message related to a handoff of a mobile station (MS);
   allocating, by the BS in response to the message, a new PLCM for use by the MS;
   sending, by the BS in response to the message, a response message that includes a PLCM identifier that identifies the new PLCM;
   sending, by the BS, a handoff required message to a mobile switching center (MSC) for a second MS;
   receiving, by the BS from the MSC in response to the handoff required message, a handoff command message that includes a PLCM identifier that identifies a target PLCM; and
   sending, by the BS in response to the handoff command message, a handoff message to the second MS that includes a PLCM identifier that identifies the target PLCM.

2. The method of claim 1, wherein receiving the message comprises receiving a handoff request message from a mobile switching center (MSC) for a hard handoff of the MS.

3. The method of claim 2, wherein the message comprises a Handoff Request message.

4. The method of claim 1, wherein sending the response message comprises sending a handoff request acknowledgment to a mobile switching center (MSC).

5. The method of claim 1, wherein receiving the message comprises receiving a handoff request message for a hard handoff of the MS, which includes a PLCM identifier that identifies a PLCM.

6. The method of claim 5, wherein the PLCM is used by the MS prior to handoff.

7. The method of claim 5, wherein the PLCM is a member of a subset of PLCMs used by a source BS and wherein the new PLCM is a member of a subset of PLCMs used by the BS.

8. The method of claim 7, wherein the subset of PLCMs used by the BS and the subset of PLCMs used by the source BS are non-overlapping.

9. The method of claim 1, further comprising
   receiving, by the BS, call content from the MS encoded using the new PLCM, wherein call content comprises content selected from the group consisting of voice, audio, video, text messaging, and data;
   transmitting, by the BS, call content to the MS encoded using the new PLCM.

10. The method of claim 1, wherein the handoff message comprises a handoff direction message.

11. The method of claim 10, wherein the handoff message comprises a Universal Handoff Direction Message (UHDM).

12. The method of claim 1, wherein the handoff command message comprises a Handoff Command message.

13. The method of claim 1, wherein sending the handoff required message comprises sending the handoff required message, which includes a PLCM identifier that identifies a source PLCM.

14. The method of claim 11, wherein the source PLCM is a member of a subset of PLCMs used by the BS and wherein the target PLCM is a member of a subset of PLCMs used by a target BS.

15. The method of claim 14, wherein the subset of PLCMs used by the BS and the subset of PLCMs used by the target BS are non-overlapping.

16. The method of claim 11, further comprising
receiving, by the BS, call content from the second MS encoded using the source PLCM.

17. The method of claim 11, further comprising
transmitting, by the BS, call content to the second MS encoded using the source PLCM.

18. A base station (BS) comprising:
a base site controller (BSC)
adapted to receive a message related to a handoff of a mobile station (MS),
adapted to allocate, in response to the message, a new public long code mask (PLCM) for use by the MS, and
adapted to send, in response to the message, a response message that includes a PLCM identifier that identifies the new PLCM;
a base transceiver system (BTS), communicatively coupled to the BSC, adapted to communicate with the MS using the new PLCM, wherein the BSC is further
adapted to send a handoff required message to a mobile switching center (MSC) for a second MS,
adapted to receive, from the MSC in response to the handoff required message, a handoff command message that includes a PLCM identifier that identifies a target PLCM, and
adapted to send, via the BTS in response to the handoff command message, a handoff message to the second MS that includes a PLCM identifier that identifies the target PLCM.

19. A method for public long code mask (PLCM) handoff management comprising:
receiving, by a base station (BS), a handoff request message for a mobile station (MS);
sending, by the BS in response to the handoff request message, a Handoff Request Acknowledge message that includes a PLCM for the MS;
sending, by the BS, a handoff required message to a mobile switching center (MSC) for a second MS;
receiving, by the BS from the MSC in response to the handoff required message, a Handoff Command message that includes a target PLCM; and
sending, by the BS in response to the Handoff Command message, a Universal Handoff Direction Message (UHDM) to the second MS that includes the target PLCM.

* * * * *

UNITED STATES PATENT AND TRADEMARK OFFICE
CERTIFICATE OF CORRECTION

PATENT NO. : 7,496,069 B2  Page 1 of 1
APPLICATION NO. : 10/431736
DATED : February 24, 2009
INVENTOR(S) : Loh et al.

It is certified that error appears in the above-identified patent and that said Letters Patent is hereby corrected as shown below:

In Column 4, Line 41, delete "PLOM_32" and insert -- PLCM_32 --, therefor.

In Column 7, Line 11, in Claim 14, delete "claim 11," and insert -- claim 13, --, therefor.

In Column 7, Line 18, in Claim 16, delete "claim 11," and insert -- claim 13, --, therefor.

In Column 7, Line 21, in Claim 17, delete "claim 11," and insert -- claim 13, --, therefor.

Signed and Sealed this

Fourteenth Day of July, 2009

JOHN DOLL
*Acting Director of the United States Patent and Trademark Office*